United States Patent
Berninger et al.

(10) Patent No.: US 12,321,454 B1
(45) Date of Patent: Jun. 3, 2025

(54) COMMAND LINE PARSING FOR CLASSIFICATION OF PROCESS START ALERTS

(71) Applicant: Rapid7, Inc., Boston, MA (US)

(72) Inventors: Matthew Berninger, Denver, CO (US); Roy Hodgman, Cambridge, MA (US); Katherine Wilbur, Brookline, MA (US); Vasudha Shivamoggi, Arlington, MA (US); Lauren Johnson, Boston, MA (US); Jacqueline Daniel, Bainbridge Island, WA (US); Luke Ludington, Stratham, NH (US)

(73) Assignee: Rapid7, Inc., Boston, MA (US)

( * ) Notice: Subject to any disclaimer, the term of this patent is extended or adjusted under 35 U.S.C. 154(b) by 264 days.

(21) Appl. No.: 17/708,893

(22) Filed: Mar. 30, 2022

(51) Int. Cl.
  *G06F 21/56* (2013.01)
  *G06F 21/55* (2013.01)

(52) U.S. Cl.
  CPC .......... *G06F 21/566* (2013.01); *G06F 21/554* (2013.01); *G06F 2221/034* (2013.01)

(58) Field of Classification Search
  CPC . G06F 21/566; G06F 21/554; G06F 2221/034
  See application file for complete search history.

(56) References Cited

U.S. PATENT DOCUMENTS

| | | | |
|---|---|---|---|
| 8,745,742 B1 * | 6/2014 | Satish | G06F 7/00 380/232 |
| 10,572,801 B2 | 2/2020 | Mars et al. | |
| 10,754,957 B2 * | 8/2020 | Silverstone | G06F 21/602 |
| 10,789,755 B2 | 9/2020 | Amer et al. | |
| 11,436,327 B1 * | 9/2022 | Vashisht | G06F 21/565 |
| 11,509,674 B1 * | 11/2022 | Beauchesne | H04L 63/1425 |
| 2017/0278514 A1 | 9/2017 | Mathias et al. | |
| 2018/0012144 A1 * | 1/2018 | Ding | H04L 63/1466 |
| 2019/0303605 A1 * | 10/2019 | Okabe | G06F 40/126 |
| 2020/0285737 A1 * | 9/2020 | Kraus | G06F 21/552 |
| 2021/0117544 A1 * | 4/2021 | Kurtz | G06F 21/567 |
| 2023/0232235 A1 * | 7/2023 | Sedjelmaci | H04L 63/1433 726/23 |

* cited by examiner

*Primary Examiner* — Luu T Pham
*Assistant Examiner* — Paul J Skwierawski
(74) *Attorney, Agent, or Firm* — Ashwin Anand; Lei Sun

(57) ABSTRACT

A method includes obtaining a command captured at a computing device to start a process on the computing device submitted via a command line interface. The command is of a plurality of commands captured at respective computing devices that triggered respective alerts to review the plurality of commands. The method includes parsing the command to generate a plurality of tokens that represent the command according to dictionary of features of commands submitted via the command line interface, generating a feature vector based, at least in part, on the plurality of tokens, applying a classification model, trained on other commands submitted via the command line interface to predict benign commands, to the feature vector to determine a score indicative of a probability that the command is benign, and, responsive to a determination that the score is above a confidence threshold, removing the command from the plurality of commands to be reviewed.

20 Claims, 7 Drawing Sheets

COMMAND LINE PARSING FOR CLASSIFICATION OF PROCESS START ALERTS

TECHNICAL FIELD

This disclosure is related to network computing systems. In particular, this disclosure is related to classifying process start alerts.

BACKGROUND

Process start events have emerged as a powerful way for security analysts to find indicators of malicious activity. In practice, however, these events may have low-fidelity. Analysts reviewing process start events may find that the vast majority are not malicious, but instead are benign, which may not only increase their workload, but may also delay them from investigating genuinely malicious events.

SUMMARY OF EMBODIMENTS

Disclosed herein are methods, systems, and apparatuses for classifying process start alerts. Embodiments described herein utilize a process start alert classifier system. The process start alert classifier system may obtain a command to start a process on a computing device submitted via a command line interface. The command may have been captured at the computing device. The command may be one of a plurality of commands captured at respective computing devices that triggered respective alerts to review the plurality of commands. The process start alert classifier system may parse the command to generate a plurality of tokens that represent the command according to a dictionary of features of commands submitted via the command line interface. The process start alert classifier system may generate a feature vector based, at least in part, on the plurality of tokens. The process start alert classifier system may apply a classification model, trained on other commands submitted via the command line interface to predict benign commands, to the feature vector to determine a score indicative of a probability that the command is benign. The process start alert classifier system may, responsive to a determination that the score is above a confidence threshold, remove the command from the plurality of commands to be reviewed.

Figure 1:
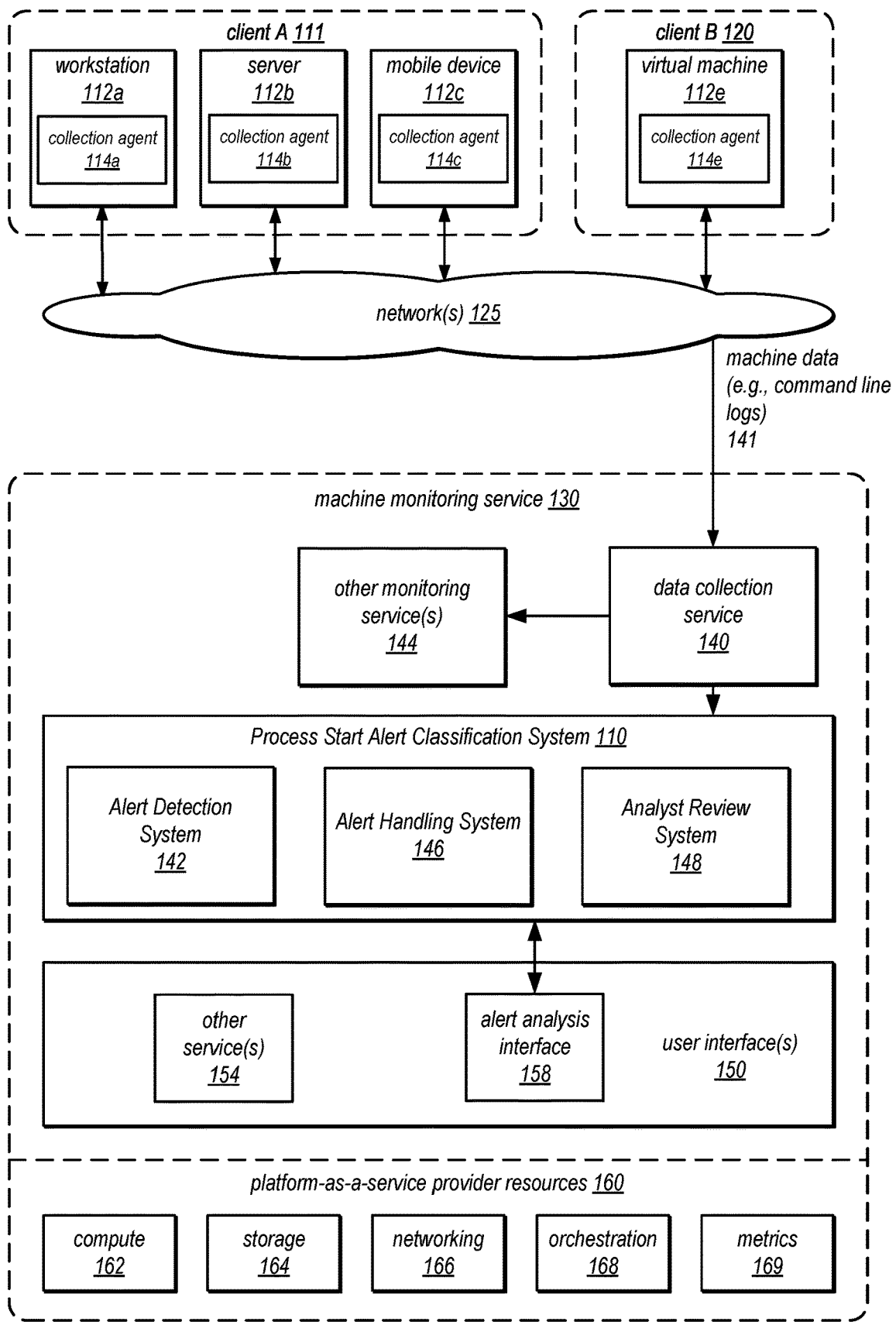
FIG. 1 is a block diagram illustrating a machine monitoring service implemented by a platform-as-a-service provider network that implements a process alert classification according to some aspects

While the disclosure is open to various modifications and alternative implementations, specific embodiments of the disclosure are provided as examples in the drawings and detailed description. It should be understood that the drawings and detailed description are not intended to limit the disclosure to the particular form disclosed.

DETAILED DESCRIPTION

Process start events have emerged as a powerful way for security analysts to find indicators of malicious activity. In practice, however, these events may be low-fidelity. Analysts reviewing process start events may find that the vast majority are benign, which may not only increase their workload, but may also delay them from investigating the genuinely malicious events. The concepts described herein may use a tool (e.g., a process alert classifier) to reduce the volume of false positive process start alerts by clearing out the obviously benign process start alerts.

A process alert classifier may look at the command line component of a process start event that triggered an alert, and may run the command line against a model built with previously observed command lines and the labels assigned to them by analysts. If the command line is sufficiently similar to the ones in previously seen benign alerts, the process alert classifier may label the alert benign, allowing an analyst to ignore or de-prioritize the alert. Thus, this tool may convert command lines—which the analysts most frequently use to qualify alerts—into vectors (e.g., numeric vectors) that can then be used to construct a model.

The structure and format of a command line may contain a lot of information about the intent of the code. For example, a combination of commands and file paths may provide an indication of an expected action, or the command file and/or the file path looks suspicious. Each executable may have its own set of rules for indicating a format of fields, similar to rules for parts of speech in natural language. However, since these command lines may not be written in a natural language, a natural language tool may not be useful to extract the parts of speech. As described herein, the process alert classifier may use an analogous way to parse the relevant tokens out of the components allowing for a reduction of the command lines to their relevant components and also to identify the command lines as arguments, commands, or the like. Having a set of tokens for a command line, the process alert classifier may convert the set of tokens into a feature vector that may be used as an input for a classifier model. A TF/IDF method may promote the importance of uncommon tokens, as well as statistical features on the command line overall. The resulting model may receive unstructured command line strings, and return a prediction based on how similar its tokens are to tokens in command lines that analysts have labeled benign. For instance, a command line parser, which takes text-based strings in a domain (e.g., executables) that does not utilize a natural language, applies semantic meaning to the text-based string, and uses that applied meaning to create tokens for classification.

For instance, an alert detection system (e.g., IDR®) may receive a plurality of commands each to start a process according to a command line interface (e.g., a text string, and executable, or the like) (hereinafter "executable" or "executables"). In some aspects, each executable may be associated with and/or be an event and/or a process. The alert detection system, using a set of one or more rules, may evaluate whether each respective executable is determined to be potentially malicious or determined to be benign. In some aspects, the alert detection system may receive an executable and subsequently pass/process the executable through an alert engine. In some instances, the alert engine may attach an alert to a respective executable when that executable is determined to be potentially malicious. In some instances, the alert engine may attach an alert to a respective executable when that executable is determined not to be definitively benign. For example, the alert detection system may generate an alert for a received executable when at least a component of the received executable triggers at least one rule of the set of one or more rules. Thus, in some aspects, a component of the received executable may trigger a rule regardless of the context of the executable or the surrounding information related to the executable. For example, the alert detection system may receive an executable (and/or an alert generated by a process start event for an executable) including a particular URL and trigger a rule that indicates that an alert is to be attached to or associated with any executable that includes that particular URL. In other words, each of the respective rules of the set of one or more rules may be so broad, that the alert detection system may attach an alert to an executable without looking at the context of the executable (or another component of the executable) and/or other executables related to or interacting with the executable.

A managed services team (e.g., a managed detection response team) may hire skilled human analysts to review the alerts attached to respective executable that are attached by the alert detection system. Upon being reviewed by the skilled human analysts, each of the alerts may receive a label. A label identifies whether an alert is malicious, benign, or indeterminable (e.g., unable to determine whether the alert is malicious or benign). When an alert is labeled as benign, the alert may be passed through (e.g., approved) and a determination may be made that no one (e.g., no skilled human analyst) should spend more time examining the executable and/or the alert associated with the executable. When an alert is labeled as malicious or indeterminable, the alert may be presented to the client for further investigation, clarification, or damage mitigating actions. Currently, the skilled human analysts may spend a lot of time closing out alerts attached to executables by the alert detection system that, but for the very broad rules, are easily determined to be benign, thereby wasting time of the skilled human analysts that could otherwise be used to investigate more dangerous or potentially more dangerous alerts and/or used to investigate a larger quantity of more appropriate alerts. In some aspects, a larger percentage of all alerts received from the alert detection system by the skilled human analysts may be immediately closed by the skilled human analysts as being benign with little to no in-depth investigation.

As described herein, a process alert classifier system may be implemented to obtain executables and associated alerts from the alert detection system before being provided to a skilled human analyst. Using historical data and machine learning techniques, the process alert classifier system may identify, amongst all the obtained alerts and associated executables from the alert detection system, alerts and associated executables that have a high or very high likelihood of being benign. The process alert classifier system may then approve or pass those executables and associated alerts that have a high or very high likelihood of being benign for continued use by client systems without further examination by an analyst review system and/or the skilled human analysts. Accordingly, an analyst review system and/or the skilled human analyst may have more time to investigate more dangerous or potentially more dangerous alerts and/or more time to investigate a larger quantity of more appropriate alerts.

FIG. 1 is a block diagram illustrating a machine monitoring service implemented by a platform-as-a-service provider network that implements a process alert classification according to some aspects. As shown in the FIG. 1, a machine monitoring service 130 is implemented using a platform-as-a-service (PaaS) provider network. The machine monitoring service 130 may be operated by a provider company to provide a number of cloud-based client-facing services 140, 142, 144, and 110 to various clients. The client networks 111 and 120 may be operated by different groups, organizations, companies, or other types of entities that are customers of the machine monitoring service 130. In some embodiments, different clients may be associated with different user accounts of the machine monitoring service 130.

In various embodiments, the network(s) 125 may encompass any suitable combination of networking hardware and protocols necessary to establish communications between the client networks 111 and 120 and the machine monitoring service 130. In some aspects, the machines 112 may execute in a private network of a company, behind a company firewall, and the network 125 may include a public network such as the Internet, which lies outside the firewall. The network 125 may encompass the different telecommunications networks and service providers that collectively implement the Internet. In some embodiments, the network 125 may also include private networks such as private local area networks (LANs), private wide area networks (WANs), or private wireless networks. The network 125 may be implemented using different hardware (e.g., modems, routers, switches, load balancers, proxy servers, etc.) and software (e.g., protocol stacks, accounting software, firewall/security software, etc.) for establishing networking links between the client networks 111 and 120 and the machine monitoring service 130.

As shown, the client networks 111 and 120 may include different types of computing resources, such as a workstation 112a, a server 112b, a mobile device 112c, and a virtual machine 112e. Each of these types of machines may implement a web server (e.g., web servers 113a, 113b, 113c, and 113e). Likewise, each of these types of machine may implement a collection agent (e.g., collection agents 114a, 114b, 114c, and 114e). The virtual machine 112e may be an instance of an emulated computer or execution environment that is hosted on a physical virtual machine host. The virtual machine host may implement virtualization hardware and/or software (e.g., hypervisors) to execute and manage multiple instances of guest operating systems. Example implementations of such virtualization technologies include VMWARE ESX/ESXI®, MICROSOFT HYPERV®, AMAZON WEB SERVICES®, and MICROSOFT AZURE®. Another type of virtual machine is the container, which provides a portable and isolated execution environment over a host operating system of a physical host. Example implementations of container technologies include DOCKER®, GOOGLE KUBERNETES®, AMAZON WEB SERVICES®, and MICROSOFT AZURE®. As may be appreciated, the machines 112 may include a variety of other types of computing systems, including embedded systems, networking devices, storage devices, Internet-of-Things (IoT) devices, vehicles, and the like.

As shown, the machine monitoring service 130 may implement a data collection service 140. In some aspects, the data collection service 140 may be configured to collect specified machine characteristics data 141 about the assets operated by a large number of clients, including information such as command line logs or other information that includes command lines collected for performing process alert classification. The collections may be performed using different means, such as collection agents 114 on the machines 112, specialized data collection appliances located in the client private networks 111 and 120, or network scanners operated as part of the machine monitoring service 130. In some aspects, the data collections may be controlled via configuration information specified by the administrators of the clients. The collections may occur periodically according to a set schedule, or based on certain specified events (e.g., in response to changes in the client network or a request from the data collection service 140). In some embodiments, the collected data 141 may be used to maintain an up-to-date virtual representation of the machines or entire client networks, which is used by the machine monitoring service 130 to perform a variety of assessments of client assets, including processes of a process start alert classification system 110.

The process start alert classification system 110 may evaluate web server configuration files and other collected machine data 141 to classify process start alerts, for example, hosted by web servers 113. Results of these process start alert classifications may be stored in store 112 which may be accessible to other services, such as an alert detection system 142, an alert handling system 146, and/or an analyst review system 148. The alert detection system 142, the alert handling system 146, and/or the analyst review system 148 may described further herein. As shown, the machine monitoring service 130 may implement the alert handling system 146. In some aspects, the alert handling system 146 may obtain executables and associated alerts from the alert detection system 142 before being provided to the analyst review system 148. Using historical data and machine learning techniques, the alert handling system 146 may identify, amongst all the obtained alerts and associated executables from the alert detection system, alerts and associated executables that have a high or very high likelihood of being benign. The alert handling system 146 may then approve or pass those executables and associated alerts that have a high or very high likelihood of being benign for continued use by client systems without further examination by an analyst review system and/or the skilled human analysts. Accordingly, an analyst review system and/or the skilled human analysts may have more time to investigate more dangerous or potentially more dangerous alerts and/or more time to investigate a larger quantity of more appropriate alerts.

Executables may be obtained using various user interfaces 150, including the alert analysis interface 158. For example, the alert analysis interface 158 may utilize various electronic communication systems and protocols (e.g., posting notifications to user dashboards or other user interface elements, sending email or other messages to different recipients, etc.) to perform process alert classification.

As shown, the machine monitoring service 130 may implement various other monitoring services, such as for various malicious behavior (e.g., network-based attacks), failures, or other error scenarios at machines 112. Such other monitoring services 144 may utilize machine data 141 collected by analyst review system 148 to implement various monitoring tasks. Similar to the interface 158, these other monitoring service(s) 144 may be managed, accessed, or otherwise utilize other service(s) interface 154 to communicate various information related to other monitoring services 144 operations.

As shown, the machine monitoring service 130 may also implement a user interface 150, which provides the interfaces 154 and 158, as discussed. The user interface 150 may be a web-based interface that is accessible via a web browser. The user interface 150 may be a graphical or command line user interface. In some embodiments, the user interface 150 may also include real-time notification interfaces such as email or text interfaces. In some embodiments, the user interface 150 may be implemented as part of a user console to allow users to configure various aspects of the machine monitoring service 130, receive assessments reports, and carry out remediation actions. In some embodiments, the user interface 150 will allow users to specify how the process start alert classification system 110 should operate, such as the frequency and/or conditions under which process start alert classifications should be initiated or updated.

As a whole, the machine monitoring service 130 may be implemented as a number of web services that receive web services requests formatted as JSON documents. The machine monitoring service 130 may support REST-style or document-based (e.g., SOAP-based) types of web services requests. In some embodiments, the machine monitoring service 130 may implement service interfaces using other types of remote procedure calling protocols, such as GOOGLE PROTOCOL BUFFERS® or PROTOBUF®. The PaaS provider network may provide hardware and/or software to implement service endpoints, such that a request directed to that endpoint is properly received and processed.

As shown, the PaaS provider network may provide different types of computing resources 160 for the machine monitoring service 130, which can be leased by the operator of the machine monitoring service 130. The PaaS provider may provide resource services such as compute resource service 162, storage resource service 164, networking resources service 166, orchestration service 168, and resource metrics service 169. The services of the machine monitoring service 130 may be built using these underlying resource services provided by the PaaS provider. In some embodiments, the PaaS resources 160 may implement features such as load balancing of incoming service requests and/or dynamic management and scaling of service node pools. In some embodiments, each of the systems 140, 142, 144, 146, 148, and 110 may be implemented using a pool of service nodes provided by the PaaS provider, which may be individual instances of virtual machines. In some embodiments, the PaaS provider may be a provider such as AMAZON WEB SERVICES® or MICROSOFT AZURE®.

Figure 2:
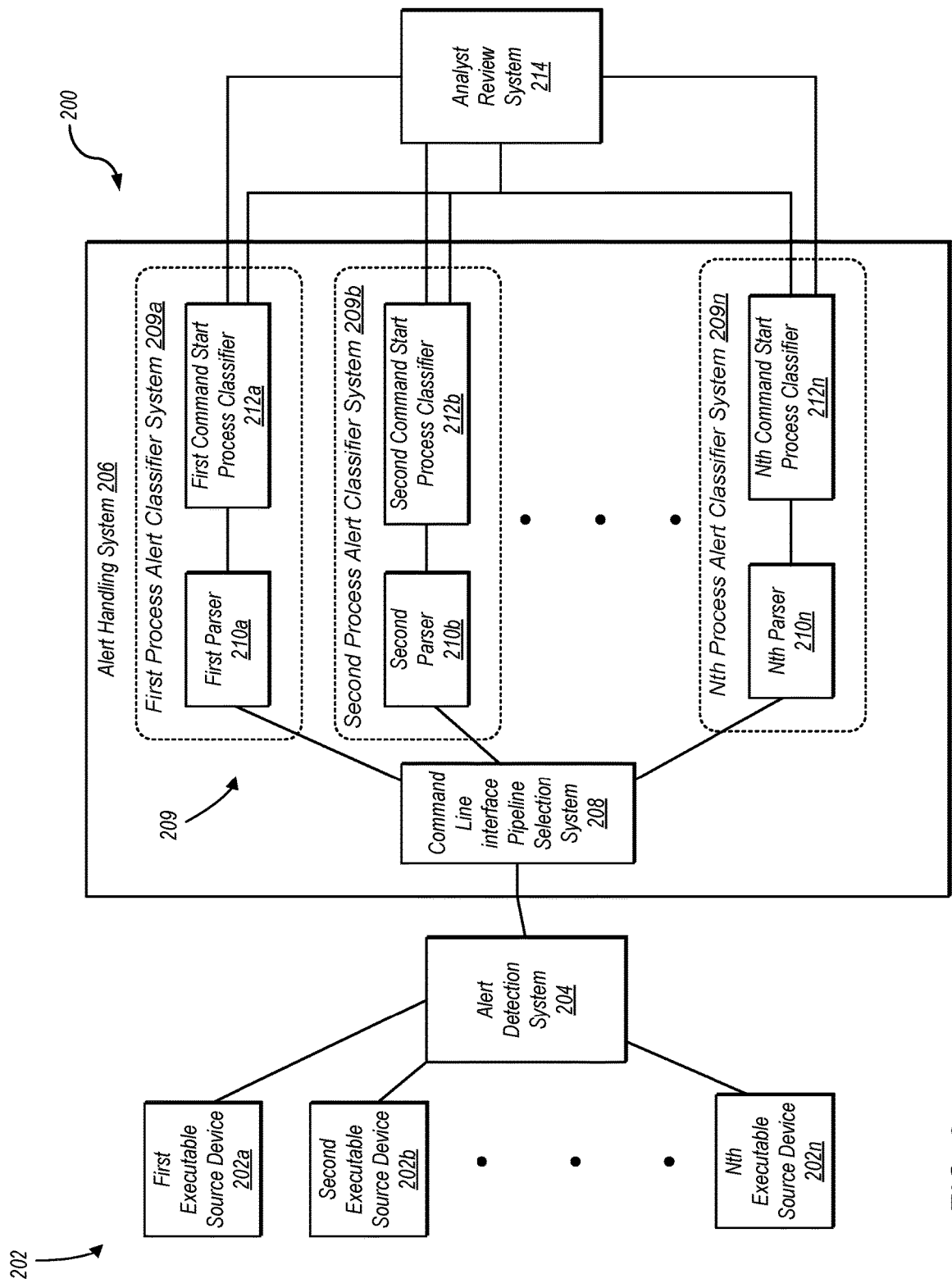
FIG. 2 illustrates an example diagram of a process start alerts classification system according to some aspects.

FIG. 2 illustrates an example diagram of a process start alerts classification system 200 according to some aspects. The process start alerts classification system 200 may be for classifying one or more process start alerts associated with respective executables having one or more components (e.g., a command line) and one or more respective alerts. The process start alert classification system 200 may be the same as or at least similar to the process start alert classification system 100 illustrated in FIG. 1. As shown in FIG. 2, the process start alerts classification system 200 may include a plurality of executables source devices 202. For example, the plurality of executable source device may include a first executable source device 202a, a second executable source device 202b, and a Nth executable source device 202n. Each executable source device of the plurality of executable source devices 202 may include a computing device configured to have (e.g., store, utilize) executables for an alert detection system, an alert handling system, and/or an analyst review system as described herein.

The process start alerts classification system 200 may also include an alert detection system 204. The alert detection system 204 (e.g., IDR®) may obtain the plurality of executables from at least one executable source device of the plurality of executable source devices 202. In some aspects, each executable may be associated with and/or be at least one of an event, a process, or the like. The alert detection system 204, using a set of one or more rules, may evaluate whether each respective executable is determined to be potentially malicious or determined to be definitively benign. In some aspects, the alert detection system 204 may obtain an executable and subsequently pass/process the executable through an alert engine. In some instances, the alert engine may attach an alert to a respective executable indicating that the alert is potentially malicious when that executable is determined to be potentially malicious. In some instances, the alert engine may attach an alert to a respective executable indicating that the alert is not definitively benign when that executable is determined not to be definitively benign. In some instances, the alert engine may attach an alert to a respective executable indicating that the alert is definitively benign when that executable is determined to be definitively benign. As an example, the alert detection system 204 may generate an alert for a received executable when at least a component (e.g., a command line) of the received executable triggers at least one rule of the set of one or more rules. Thus, in some aspects, a component of the received executable may trigger a rule regardless of the context of the executable or the surrounding information related to the executable. For example, the alert detection system 204 may receive an executable including a particular URL and trigger a rule that indicates that an alert is to be attached to or associated with any executable that includes that particular URL. In other words, each of the respective rules of the set of one or more rules may be broad such that the alert detection system 204 may attach an alert to a executable without looking at the context of the executable (or another component of the executable) and/or other executables related to or interacting with the executable.

The process start alerts classification system 200 may further include an alert handling system 206. In some aspects, the alert handling system 206 may include a command line interface pipeline selection system 208 and one or more process alert classifier systems 209. In some aspects, the one or more process alert classifier systems 209 may include a first process alert classifier system 209a, a second process alert classifier system 209b, and an Nth process alert classifier system 209n. In some aspects, each of the one or more process alert classifier system 209 may include a parser and a command start process classifier. For example, the first process alert classifier system 209a may include a first parser 210a and a first command start process classifier system 212a, the second process alert classifier system 209b may include a second parser 210b and a second command start process classifier system 212b, and the Nth process alert classifier system 209n may include an Nth parser 210n and an Nth command start process classifier system 212b.

The alert handling system 206 may be configured to obtain an executable (e.g., a command) to start a process on a computing device (e.g., an executable source device) submitted via a command line interface. The executable may have been captured at the computing device. In some aspects, in addition to or as an alternative to obtaining an executable to start a process, the alert handling system 206 may obtain information about an execution of an executable (e.g., a process start event record) on a computing device and use the information about the execution of the executable in addition to or as an alternative to using the executable as described herein. In some aspects, the executable and/or the information about an execution of an executable may, instead of being submitted via a command line interface, be captured on a device and sent through an API to the alert handling system 206. The executable may be one of a plurality of executables captured at respective computing devices that triggered respective alerts to review the plurality of executables. For example, the first process alert classifier system 209a may obtain, via the alert detection system 204 and/or the command line interface pipeline selection system 208, an executable to start a process on the first executable source device 202a submitted via a command line interface. The executable may have been captured at the first executable source device 202a. The executable may be one of a plurality of executables captured at respective computing devices (e.g., the first executable source device 202a, the second executable source device 202b, the Nth executable source device 202n) that triggered respective alerts to review the plurality of executables. In some aspects, the alert handling system 206 may obtain an executable including at least one alert associated with at least one component of the executable. The alert detection system 204 may associate the alert with the at least one component of the executable. For example, the at least one alert may indicate that the executable is not benign.

The alert handling system 206 may be configured to parse the executable to generate a plurality of tokens that represent the executable according to a dictionary of features of executables submitted via the command line interface. For example, upon the first process alert classifier system 209a obtaining an executable (e.g., a command) to start a process on a computing device (e.g., an executable source device) submitted via a command line interface, the first parser 210a may parse the executable to generate a plurality of tokens that represent the executable according to a dictionary of features of executables submitted via the command line interface. In some aspects, the plurality of tokens may apply semantic meaning to text of at least one component of the executable in accordance with a classification model. The alert handling system 206 may parse one or more characteristics from respective executables including at least one of a quantity of alpha-numeric characters of each of the respective components, a quantity of special characters of each of the respective components, a length of each respective component, a quantity of spaces in each of the respective components, or the like. In some aspects, the alert handling system 206 parsing the executable to generate the plurality of tokens that represent the executable according to the dictionary of terms for executables submitted via the command line interface may include the alert handling system 206 replacing a block of characters in the executable with a mask token corresponding to a generic feature of the executable. For example, the first parser 210a parsing the executable to generate the plurality of tokens that represent the executable according to the dictionary of terms for executables submitted via the command line interface may include the first parser 210a replacing a block of characters in the executable with a mask token corresponding to a generic feature of the executable.

In some aspects, the alert handling system 206 parsing the executable to generate the plurality of tokens that represent the executable according to the dictionary of terms for executables submitted via the command line interface may include the alert handling system 206 replacing a block of characters of a path in the executable with a normalized value as part of a mask token. For example, the first parser 210a parsing the executable to generate the plurality of tokens that represent the executable according to the dictionary of terms for executables submitted via the command line interface may include the first parser 210a replacing a block of characters of a path in the executable with a normalized value as part of a mask token. In some aspects, the alert handling system 206 parsing the executable to generate the plurality of tokens that represent the executable according to the dictionary of terms for executables submitted via the command line interface may include the alert handling system 206 removing one or more characters or modify one or more characters from at least one of the plurality of tokens to normalize the plurality of tokens. For example, the first parser 210a parsing the executable to generate the plurality of tokens that represent the executable according to the dictionary of terms for executables submitted via the command line interface may include the first parser 210a removing one or more characters or modify one or more characters from at least one of the plurality of tokens to normalize the plurality of tokens.

The alert handling system 206 may be configured to generate a feature vector based, at least in part, on the plurality of tokens. For example, after the first process alert classifier system 209a parses the executable to generate a plurality of tokens that represent the executable according to a dictionary of features of executables submitted via the command line interface, the first process alert classifier system 209a may generate a feature vector based, at least in part, on the plurality of tokens. For instance, after the first parser 210a parses the executable to generate a plurality of tokens that represent the executable according to a dictionary of features of executables submitted via the command line interface, the first process alert classifier system 212a may generate a feature vector based, at least in part, on the plurality of tokens. In some aspects, the first parser 210a generating the feature vector, may include that the first parser 210a includes one or more features that represent a lineage of one or more previously started processes that led to the executable to start the process.

The alert handling system 206 may be configured to apply a classification model, trained on other executables submitted via the command line interface to predict benign executables, to the feature vector to determine a score indicative of a probability that the executable is benign. For example, after the first process alert classifier system 209a generates a feature vector based, at least in part, on the plurality of tokens, the first process alert classifier system 209a may apply a classification model, trained on other executables submitted via the command line interface to predict benign executables, to the feature vector to determine a score indicative of a probability that the executable is benign. For instance, after the first parser 210a generates a feature vector based, at least in part, on the plurality of tokens, the first process alert classifier system 212a may apply a classification model, trained on other executables submitted via the command line interface to predict benign executables, to the feature vector to determine a score indicative of a probability that the executable is benign. In some aspects, the classification model is trained on a subset of the dictionary of features of the executables submitted via the command line interface.

The alert handling system 206 may be configured to remove the executable from the plurality of executables to be reviewed. In some aspects, the alert handling system 206, responsive to a determination that the score is above a confidence threshold, may remove the command from the plurality of commands to be reviewed. For example, after the first process alert classifier system 209a applies a classification model, trained on other executables submitted via the command line interface to predict benign executables, to the feature vector to determine a score indicative of a probability that the executable is benign, the first process alert classifier system 209a may, responsive to a determination that the score is above a confidence threshold, remove the command from the plurality of commands to be reviewed. For instance, after the first process alert classifier system 212a applies a classification model, trained on other executables submitted via the command line interface to predict benign executables, to the feature vector to determine a score indicative of a probability that the executable is benign, the first process alert classifier system 212a may, responsive to a determination that the score is above a confidence threshold, remove the executables from the plurality of executables to be reviewed.

In some aspects, the alert handling system 206 may be implemented as part of a machine monitoring service, as discussed above with regard to FIG. 1. The respective alerts of the plurality of executables may be detected by the alert detection system 204 implemented as part of the machine monitoring service. The alert detection system 204 may collect the plurality of executables from the plurality of executable source devices 202. The plurality of executables to be reviewed may be provided to an analyst review system 214 implemented as part of the machine monitoring service for further review.

The alert handling system 206 may be configured to obtain a second executable (e.g., a second command) to start a second process on a second computing device (e.g., an executable source device) submitted via a second (e.g., a different) command line interface. The second executable may have been captured at the second computing device. The second executable may be one of the plurality of executables captured at respective computing devices that triggered respective alerts to review the plurality of executables. For example, the second process alert classifier system 209b may obtain, via the alert detection system 204 and/or the command line interface pipeline selection system 208, an executable to start a process on the second executable source device 202b submitted via the second command line interface. The second executable may have been captured at the second executable source device 202b. The second executable may be one of the plurality of executables captured at respective computing devices (e.g., the first executable source device 202a, the second executable source device 202b, the Nth executable source device 202n) that triggered respective alerts to review the plurality of executables. In some aspects, the alert handling system 206 may obtain a second executable including at least one alert associated with at least one component of the second executable. The alert detection system 204 may associate the alert with the at least one component of the second executable. For example, the at least one alert may indicate that the second executable is not benign.

The alert handling system 206 may be configured to parse the second executable to generate a plurality of tokens that represent the second executable according to a dictionary of features of executables submitted via the command line interface. For example, upon the second process alert classifier system 209b obtaining a second executable (e.g., a second command) to start a second process on a second computing device (e.g., a second executable source device)

submitted via a second command line interface, the second parser 210*b* may parse the second executable to generate a second plurality of tokens that represent the second executable according to the dictionary of features of executables submitted via the second command line interface. In some aspects, the second plurality of tokens may apply semantic meaning to text of at least one component of the second executable in accordance with a classification model. In some aspects, the alert handling system 206 parsing the executable to generate the plurality of tokens that represent the executable according to the dictionary of terms for executables submitted via the second command line interface may include the alert handling system 206 replacing a block of characters in the second executable with a second mask token corresponding to a generic feature of the second executable. For example, the second parser 210*b* parsing the second executable to generate the second plurality of tokens that represent the second executable according to the dictionary of terms for executables submitted via the second command line interface may include the second parser 210*b* replacing a block of characters in the second executable with a mask token corresponding to a generic feature of the second executable.

In some aspects, the alert handling system 206 parsing the second executable to generate the second plurality of tokens that represent the second executable according to the dictionary of terms for executables submitted via the second command line interface may include the alert handling system 206 replacing a block of characters of a path in the second executable with a second normalized value as part of a mask token. For example, the second parser 210*b* parsing the second executable to generate the second plurality of tokens that represent the second executable according to the dictionary of terms for executables submitted via the second command line interface may include the second parser 210*b* replacing a block of characters of a path in the second executable with a second normalized value as part of a mask token. In some aspects, the alert handling system 206 parsing the second executable to generate the second plurality of tokens that represent the second executable according to the dictionary of terms for executables submitted via the second command line interface may include the alert handling system 206 removing one or more characters or modify one or more characters from at least one of the second plurality of tokens to normalize the second plurality of tokens. For example, the second parser 210*b* parsing the second executable to generate the second plurality of tokens that represent the second executable according to the dictionary of terms for executables submitted via the second command line interface may include the second parser 210*b* removing one or more characters or modify one or more characters from at least one of the second plurality of tokens to normalize the second plurality of tokens.

The alert handling system 206 may be configured to generate a second feature vector based, at least in part, on the second plurality of tokens. For example, after the second process alert classifier system 209*b* parses the second executable to generate a second plurality of tokens that represent the second executable according to a dictionary of features of executables submitted via the second command line interface, the second process alert classifier system 209*b* may generate a second feature vector based, at least in part, on the second plurality of tokens. For instance, after the second parser 210*b* parses the second executable to generate a second plurality of tokens that represent the second executable according to a dictionary of features of executables submitted via the second command line interface, the second process alert classifier system 212*b* may generate a second feature vector based, at least in part, on the second plurality of tokens. In some aspects, the second parser 210*b* generating the second feature vector, may include that the second parser 210*b* includes one or more features that represent a second lineage of one or more previously started processes that led to the second executable to start the second process.

The alert handling system 206 may be configured to apply a second classification model, trained on other executables submitted via the second command line interface to predict benign executables, to the second feature vector to determine a second score indicative of a second probability that the second executable is benign. For example, after the second process alert classifier system 209*b* generates a second feature vector based, at least in part, on the second plurality of tokens, the second process alert classifier system 209*b* may apply a second classification model, trained on other executables submitted via the second command line interface to predict benign executables, to the second feature vector to determine a second score indicative of a second probability that the second executable is benign. For instance, after the second parser 210*b* generates a second feature vector based, at least in part, on the second plurality of tokens, the second process alert classifier system 212*b* may apply a second classification model, trained on other executables submitted via the second command line interface to predict benign executables, to the second feature vector to determine a second score indicative of a second probability that the second executable is benign. In some aspects, the second classification model is trained on a subset of the dictionary of features of the executables submitted via the command line interface.

The alert handling system 206 may be configured to remove the executable from the plurality of executables to be reviewed. In some aspects, the alert handling system 206, responsive to a determination that the score is above a confidence threshold, may remove the command from the plurality of commands to be reviewed. For example, after the second process alert classifier system 209*b* applies a second classification model, trained on other executables submitted via the second command line interface to predict benign executables, to the second feature vector to determine a second score indicative of a second probability that the second executable is benign, the second process alert classifier system 209*b* may, responsive to a determination that the second score is above a second confidence threshold, remove the second executable from the second plurality of executables to be reviewed. For instance, after the second process alert classifier system 212*b* applies a second classification model, trained on other executables submitted via the second command line interface to predict benign executables, to the second feature vector to determine a second score indicative of a second probability that the executable is benign, the second process alert classifier system 212*b* may, responsive to a determination that the second score is above a second confidence threshold, remove the second executable from the second plurality of executables to be reviewed.

In some aspects, the alert handling system 206 after removing the executable from the plurality of executables, may provide the removed executable to the analyst review system 214. The alert handling system 206 may then approve or pass those executables and associated alerts that have a high or very high likelihood of being benign for continued use by client systems without further examination by the skilled human analysts and/or the analyst review system 214. Accordingly, the skilled human analysts and/or the analyst review system 214 may have more time to investigate more dangerous or potentially more dangerous alerts and/or more time to investigate a larger quantity of more appropriate alerts.

As described herein, the alert handling system 206 may include a command line interface pipeline selection system 208. The command line interface pipeline selection system 208 may determine, based on a type of an obtained executable (e.g., a type of task automation and configuration management program or a type of command line interpreter such as POWERSHELL®, UNIX SHELL®, and/or WINDOWS COMMAND PROMPT®), which process alert classification system of the plurality of process alert classification systems 209 may have the appropriate classification model for the obtained executable. For example, since executables of different executable types may each have their own specific usage and indicators of intent, different classification models may be used to classify or label executables and/or components of executables according to their respective executable types. In some cases, for related but slightly different derivative executable types that, for example, have the same usage (e.g., "POWERSHELL®" and "PWSH®"), these executable types may be grouped together so that their respective alerts may be classified or labeled using a same alert classification device and a same classification model.

In some aspects, each executable may have its own classification model for generating its own set of tokens. For example, in a first classification model for a first executable, a token may be assigned to all URLs because for the first executable, URLs may not really matter (e.g., it may not matter which specific URL it is, only that it's a URL). Conversely, in a second classification model for a second executable, a different token may be assigned to each different URL because particular URLs may be specifically benign or malicious when used with the second executable. The end classification model includes a plurality of classification models so that the end classification model may determine that type of executable and utilize an appropriate classification model of the plurality of classification models to determine probability of whether executables that are labeled benign are actually benign.

In some aspects, the process alert classifier systems (e.g., the first process alert classifier system 209a, the second process alert classifier system 209b, the nth command start process classifier 209n) may be associated with respective classification models of a plurality of classification models and use a plurality of commands or executables to start processes that have been previously labeled (e.g., as benign, not benign, malicious, or the like) to train, test, and cross-validate the respective classification models. For example, the first process alert classifier system 209a may obtain a plurality of commands that have been labeled either benign, not benign, or malicious by skilled human analysts and/or the analyst review system 214. In some aspects, the first process alert classifier system 209a may use the command line interface pipeline selection system 208 to determine which of the plurality of commands obtained are associated with respective classification models associated with the first command start process classifier 212b. Upon determining that a set of commands of the plurality of commands are associated with the first classification model of a plurality of classification models, the first process alert classifier system 209a may separate the set of commands of the plurality of commands into a least one of a training data set, a testing data set, or a cross-validation data set. The first process alert classifier system 209a may use each of the data sets to service the first classification model. For example, the first process alert classifier system 209a may use the training data set to train the first classification model of the plurality of classification models. As another example, the first process alert classifier system 209a may use the testing data set to test the first classification model of the plurality of classification models. As another example, the first process alert classifier system 209a may use the cross-validation data set to calibrate a confidence score threshold indicative of an acceptable probability that a command line is benign for the first classification model.

In some aspects, the process alert classification systems (e.g., the first process alert classifier system 209a, the second process alert classifier system 209b, the nth command start process classifier 209n) may utilize a set of commands or executables based on an age of the commands or executables. For example, each of the process alert classification systems may obtain labeled alerts associated with commands over an extended period of time from the skilled human analysts and/or the analyst review system 214. Each of the process alert classification systems may determine that labeled alerts that are labeled by the skilled human analysts and/or the analyst review system 214 beyond a predetermined period of time may not be useful for training, testing, and/or cross-validating a classification model. Each of the process alert classification systems may utilize the labeled alerts that were labeled within the predetermined period of time and may not use the labeled alerts that were labeled outside of the predetermined period of time. For example, the predetermined period of time may be a time period from a current date to a date about a year earlier than the current date, a time period from a current date to a date about nine months earlier than the current date, a time period from a current date to a date about six months earlier than the current date, a time period from a current date to a date about three months earlier than the current date, a time period from a current date to a date about one month earlier than the current date, a time period from a current date to a date about two weeks earlier than the current date, a time period from a current date to a date about a week earlier than the current date, or the like. Executables and associated labeled alerts received from the analyst review system 214 outside the predetermined period of time may not be used to construct a classification model.

In some aspect, the process alert classifier systems may separate the plurality of labeled alerts into the plurality of data sets based on an age of each respective labeled alert from a date that the respective labelled alert was received. For example, the age may include a threshold age that is no more than a year from the date that the respective labeled alert was received. In some aspects, the age could be no older than sixty days or one hundred days. In some aspects, the process alert classifier system may pre-process one or more sections of the respective components that are foreign coded. For example, the process alert classifier system may decode the one or more sections of the respective components that are foreign coded and insert the one or more decoded sections of respective components back into a position of the respective component within the respective executable.

Figure 3:
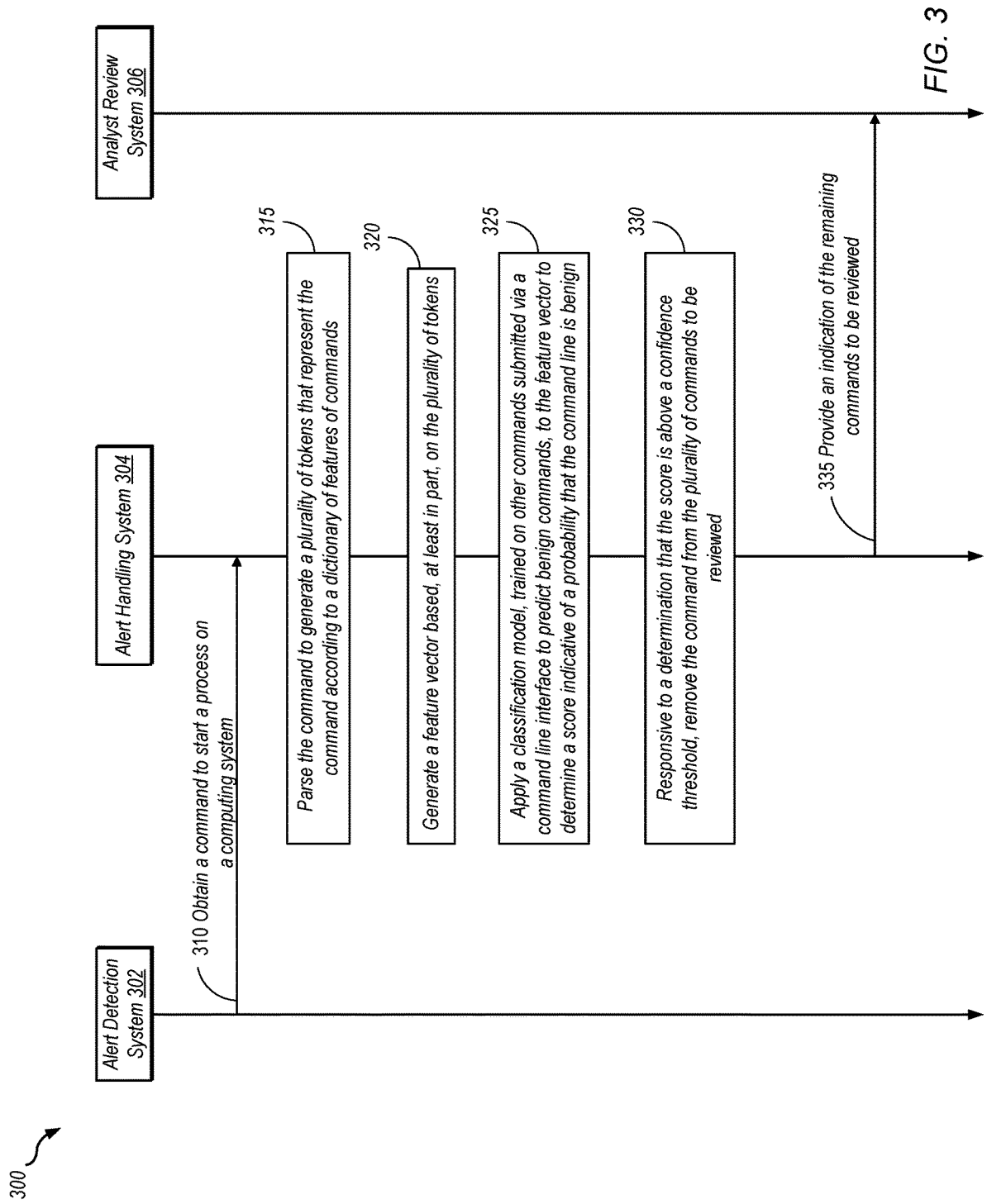
FIG. 3 illustrates an example system for classifying process start alerts according to some aspects.

FIG. 3 illustrates an example system 300 for classifying process start alerts according to some aspects. The example system 300 may include one or more same or similar features of the machine monitoring service illustrated in FIG. 1 and/or the process start alerts classification system 200 illustrated in FIG. 2. The system 300 for classifying process start alerts may include an alert detection system 302, an alert handling system 304, and an analyst review system 306.

At operation 310, the alert handling system 304 may obtain a command to start a process on a computing system from the alert detection system 302. For example, the alert detection system 302 (e.g., IDR®) may obtain the plurality of executables from at least one executable source device of the plurality of executable source devices. In some aspects, each executable may be associated with and/or be at least one of an event, a process, or the like. The alert detection system 302, using a set of one or more rules, may evaluate whether each respective executable is determined to be potentially malicious or determined to be definitively benign. In some aspects, the alert detection system 302 may obtain an executable and subsequently pass/process the executable through an alert engine. In some instances, the alert engine may attach an alert to a respective executable indicating that the alert is potentially malicious when that executable is determined to be potentially malicious. In some instances, the alert engine may attach an alert to a respective executable indicating that the alert is not definitively benign when that executable is determined not to be definitively benign. In some instances, the alert engine may attach an alert to a respective executable indicating that the alert is definitively benign when that executable is determined to be definitively benign. As an example, the alert detection system 302 may generate an alert for a received executable when at least a component (e.g., a command line) of the received executable triggers at least one rule of the set of one or more rules. Thus, in some aspects, a component of the received executable may trigger a rule regardless of the context of the executable or the surrounding information related to the executable. For example, the alert detection system 302 may receive an executable including a particular URL and trigger a rule that indicates that an alert is to be attached to or associated with any executable that includes that particular URL. In other words, each of the respective rules of the set of one or more rules may be broad such that the alert detection system 302 may attach an alert to a executable without looking at the context of the executable (or another component of the executable) and/or other executables related to or interacting with the executable.

The process start alerts classification system 300 may further include an alert handling system 304. In some aspects, the alert handling system 304 may include a command line interface pipeline selection system and one or more process alert classifier systems. In some aspects, the one or more process alert classifier systems may include a first process alert classifier system, a second process alert classifier system, and an Nth process alert classifier system. In some aspects, each of the one or more process alert classifier system may include a parser and a command start process classifier. For example, the first process alert classifier system may include a first parser and a first command start process classifier system, the second process alert classifier system may include a second parser and a second command start process classifier system, and the Nth process alert classifier system may include an Nth parser and an Nth command start process classifier system.

The alert handling system 304 may be configured to obtain an executable (e.g., a command) to start a process on a computing device (e.g., an executable source device) submitted via a command line interface. The executable may have been captured at the computing device. The executable may be one of a plurality of executables captured at respective computing devices that triggered respective alerts to review the plurality of executables. For example, the first process alert classifier system may obtain, via the alert detection system 302 and/or the command line interface pipeline selection system, an executable to start a process on the first executable source device submitted via a command line interface. The executable may have been captured at the first executable source device. The executable may be one of a plurality of executables captured at respective computing devices (e.g., the first executable source device, the second executable source device, the Nth executable source device) that triggered respective alerts to review the plurality of executables. In some aspects, the alert handling system 304 may obtain a executable including at least one alert associated with at least one component of the executable. The alert detection system 302 may associate the alert with the at least one component of the executable. For example, the at least one alert may indicate that the executable is not benign.

At operation 315, the alert handling system 304 may parse the command to generate a plurality of tokens that represent the command according to a dictionary of features of commands. For example, the alert handling system 304 may be configured to parse the executable to generate a plurality of tokens that represent the executable according to a dictionary of features of executables submitted via the command line interface. For example, upon a process alert classifier system obtaining an executable (e.g., a command) to start a process on a computing device (e.g., an executable source device) submitted via a command line interface, a parser may parse the executable to generate a plurality of tokens that represent the executable according to a dictionary of features of executables submitted via the command line interface. In some aspects, the plurality of tokens may apply semantic meaning to text of at least one component of the executable in accordance with a classification model. The alert handling system 304 may parse one or more characteristics from respective executables including at least one of a quantity of alpha-numeric characters of each of the respective components, a quantity of special characters of each of the respective components, a length of each respective component, a quantity of spaces in each of the respective components, or the like.

A token may have derived features with semantic meaning from one or more textual portions for each of the respective component based on the one or more malicious component characteristics. In some aspects, the alert handling system 304 may parse the alerts and the respective commands and identify blocks such as file paths, strings, encoded text, and the like. For each block, the alert handling system 304 may parse through the alerts and either identify more blocks or extract tokens such as commands or arguments. The alert handling system 304 may repeat this process recursively until the alert handling system 304 finds no more blocks. Based on this process, the alert handling system 304 may generate a list of each token, as well as the parser's label for what kind of token it is. In some aspects, the alert handling system 304 may support base64-encoded and hex-encoded blocks. In some aspects, the classification system 308 may tokenize an alert based on an operating system. For example, WINDOWS® uses backward slashes while DARWIN®, and LINUX® use forward slashes. Thus, tokenizing may be based on the type of operating system when looking at REGEX rules because if the executable component is WINDOWS® rather than an APPLE® executable component, then the classification system 308 may parse alerts and generate tokens differently.

The alert handling system 304 may perform path normalization by identifying elements of a path across executable components (e.g., command lines) that vary slightly in composition but ultimately have the same purpose and utility. The alert handling system 304 may replace these elements with an informatively named object in order to standardize or normalize tokens derived from path (e.g., SYSTEM_BIN_DIR, ALLUSERSPROFILE). In some aspects, tokens may have very high cardinality, such as tokens for IP addresses. Such a token may result in extremely high-dimensional, extremely sparse features, one for every IP address in the training data. To avoid generating a multitude of tokens due to high cardinality, the alert handling system 304 may mask that token and replace its value by its label, "OBJ_ADDR". In this implementation, the alert handling system 304 may specify a custom mask that masked some high cardinality features that likely contain little signal, and left others unmasked. In some aspects, the alert handling system 304 may also include a fully masked list. The alert handling system 304 may also clean up tokens by lowercasing, removing whitespaces, and stripping quotes and parentheses to produce good model results. In some cases, a token may be assigned to all IP addresses to knockout examining IP addresses while individual tokens may be assigned to individual usernames or different URLs to differentiate malicious from benign command lines based on different usernames or different URLs.

In some aspects, the alert handling system 304 parsing the executable to generate the plurality of tokens that represent the executable according to the dictionary of terms for executables submitted via the command line interface may include the alert handling system 304 replacing a block of characters in the executable with a mask token corresponding to a generic feature of the executable. For example, a parser parsing the executable to generate the plurality of tokens that represent the executable according to the dictionary of terms for executables submitted via the command line interface may include the parser replacing a block of characters in the executable with a mask token corresponding to a generic feature of the executable.

In some aspects, the alert handling system 304 parsing the executable to generate the plurality of tokens that represent the executable according to the dictionary of terms for executables submitted via the command line interface may include the alert handling system 304 replacing a block of characters of a path in the executable with a normalized value as part of a mask token. For example, a parser parsing the executable to generate the plurality of tokens that represent the executable according to the dictionary of terms for executables submitted via the command line interface may include the parser replacing a block of characters of a path in the executable with a normalized value as part of a mask token. In some aspects, the alert handling system 304 parsing the executable to generate the plurality of tokens that represent the executable according to the dictionary of terms for executables submitted via the command line interface may include the alert handling system 304 removing one or more characters or modify one or more characters from at least one of the plurality of tokens to normalize the plurality of tokens. For example, the parser parsing the executable to generate the plurality of tokens that represent the executable according to the dictionary of terms for executables submitted via the command line interface may include the parser removing one or more characters or modify one or more characters from at least one of the plurality of tokens to normalize the plurality of tokens. In some aspects, the classification system 308 may parse out particular tokens (e.g., using an exclude list) that appear in a component of an executable (e.g., "a comma") and classification models will disregard these tokens indicated on the exclude list.

In some aspects, to address the class imbalance between mostly benign alerts and a small set of malicious alerts, the alert handling system 304 may group malicious and security test alerts together as "unknown". The alert handling system 304 may then label alerts as benign or unknown. The alert handling system 304 may choose which executables are eligible for a model by examining the available malicious or security test alerts. The alert handling system 304 may train models on executables that have sufficient unique malicious command lines to train on.

Additionally, or alternatively, the alert handling system 304 may identify a set of one or more benign labeled alerts of the plurality of labeled alerts, identify respective components of respective executables associated with each respective benign labeled alert of the set of one or more benign labeled alerts parse one or more benign component characteristics from the respective component of the respective executables associated with each respective benign labeled alert, where the one or more benign component characteristics comprise at least one of a quantity of alpha-numeric characters of each of the respective components, a quantity of special characters of each of the respective components, a length of each respective component, or a quantity of spaces in each of the respective components, differentiate between the benign labels and the malicious labels, generate a token having derived features with semantic meaning from one or more textual portions for each of the respective component for the executables having a benign label based on the one or more benign component characteristics, and generate, by the at least one processor, a token having derived features with semantic meaning from one or more textual portions for each of the respective component for the executables having a malicious label based on the one or more malicious component characteristics.

In some aspects, as described herein, the at least one component of the executable may be a command line. Additionally, or alternatively, at least one component may be a source of the executable (e.g., determined using metadata), a determined type of the source of the executable, and/or a determined one or more users (e.g., determined based on the source) that may be associated with malicious executable components that might have used the same source. The source of the executable (e.g., determined using metadata), the determined type of the source of the executable, and/or a determined one or more users (e.g., determined based on the source) may be, additionally, or alternatively, used by the alert handling system 304 to determine whether an alert should be labeled as benign, malicious, unknown, and/or not benign. Additionally, or alternatively, the source or parent lineage may include useful information that the alert handling system 304 may turn into a feature for a classification model. The parent lineage may be a chronologically ordered list of the executables preceding a given alert that launched the process which generated the alert. Some parent lineages may be more often observed to spawn certain child processes over others. For example, the lineage "explorer, excel" may be more often seen spawning the executable "wscript" than "powershell", so that seeing "powershell" alerts with that given lineage may be uncommon and may merit further investigation. The alert handling system 304 may use a Bayesian probability that a process is the child of a parent lineage to encode that intuition. This feature may decrease the number of false negatives (e.g., malicious alerts classified as benign).

In some aspects, the alert handling system 304 may use performance metrics to determine false negatives and to tune classification models to minimize malicious executables labeled as benign. In some cases, the classification system 308 may use performance metrics to tune models to maximize the amount of benign executables labeled as benign. The greater the amount of benign executables being properly labeled as benign by the alert handling system 304, the better. Once the alert handling system 304, using a classification model, predicts that an executable is benign, the executable may be removed from an analyst's plate. However, there may be tension between false negatives and the total number of benign executables labeled as benign and cleared by the alert handling system 304 using a classification model as being benign. To test the model, the classification system may run executables already graded by the analysts through a classification model and determine whether the total number of cleared executables is increasing (performance improving) or decreasing (performance degrading) in order to retrain a classification model to include as many malicious executables identified by the analysts as malicious as possible. In some aspects, the classification system may be tuned to maximize the cleared rate while simultaneously keeping the false negative count to a level that users may be willing to tolerate. Thus, the data set may be developed using actual feedback from analysis. Additionally, or alternatively, the data set may be developed using synthetic data received from an outside source.

At operation 320, the alert handling system 304 may generate a feature vector based, at least in part, on the plurality of tokens. For example, after a process alert classifier system parses the executable to generate a plurality of tokens that represent the executable according to a dictionary of features of executables submitted via the command line interface, the process alert classifier system may generate a feature vector based, at least in part, on the plurality of tokens. In some aspects, the parser generating the feature vector, may include that the parser includes one or more features that represent a lineage of one or more previously started processes that led to the executable to start the process.

In some aspects, the alert handling system 304 may use TF/IDF (term frequency—inverse document frequency) features that come from applying TF/IDF to a full training set of token lists. The statistical features may be dependent on one or more particular features of the particular executable component (e.g., length, number of special characters, entropy, and the like). The alert handling system 304 may train random forest classifiers. In some aspects, the alert handling system 304 may use the most important features. For example, the alert handling system 304 may use a top quantity (e.g., 20) of the most frequent and/or most useful features. The alert handling system 304 may use cross validation to set a value for the cutoff of the top quantity of most important features. As described herein, for each classification model, the alert handling system 304 may determine and provide a score indicative of a probability that the command line is benign.

The alert handling system 304 may determine that the probability (e.g., based on the score) that an alert is benign is above a threshold probability (e.g., a threshold score), the alert handling system 304 may label the alert as benign. If alert handling system 304 determines that the probability that an alert is benign is not above a threshold probability, alert handling system 304 may label the alert as unknown. In some aspects, the threshold probability may be a cutoff just above the highest-probability-benign malicious alert that is then bumped up to be safe. This ensures no false negatives, which is the biggest source of concern from the analysts' point of view. In some aspects, alert handling system 304 may use a minimum number of "unknown" alerts. The alert handling system 304 may resample malicious alerts from training to get more "unknown" alerts if necessary. In some aspects, the flow of labeled alerts from alert detection system 302 to the alert handling system 304 may be automated. The alert handling system 304 may use a separate library for training and pipelining. The alert handling system 304 may save an environment into ECR to create different environments at runtime in a cloud ML pipeline may be saved. The alert handling system 304 may use ingestion of that environment in code rather than recompiling to speed up development and may use JSON as a docker environment rather than using individual environment variables.

At operation 325, the alert handling system 304 may apply a classification model, trained on other commands submitted via a command line interface to predict benign commands, to the feature vector to determine a score indicative of a probability that the command line is benign. For example, after the process alert classifier system generates a feature vector based, at least in part, on the plurality of tokens, the process alert classifier system may apply a classification model, trained on other executables submitted via the command line interface to predict benign executables, to the feature vector to determine a score indicative of a probability that the executable is benign. For instance, after the parser generates a feature vector based, at least in part, on the plurality of tokens, the process alert classifier system may apply a classification model, trained on other executables submitted via the command line interface to predict benign executables, to the feature vector to determine a score indicative of a probability that the executable is benign. In some aspects, the classification model is trained on a subset of the dictionary of features of the executables submitted via the command line interface.

At operation 330, the alert handling system 304 may, responsive to a determination that the score is above a confidence threshold, remove the command from the plurality of commands to be reviewed. For example, after the process alert classifier system applies a classification model, trained on other executables submitted via the command line interface to predict benign executables, to the feature vector to determine a score indicative of a probability that the executable is benign, the process alert classifier system may, responsive to a determination that the score is above a confidence threshold, remove the command from the plurality of commands to be reviewed. For instance, after the process alert classifier system applies a classification model, trained on other executables submitted via the command line interface to predict benign executables, to the feature vector to determine a score indicative of a probability that the executable is benign, the process alert classifier system may, responsive to a determination that the score is above a confidence threshold, remove the executables from the plurality of executables to be reviewed.

At operation 335, the alert handling system 304 may provide an indication of the remaining commands to be reviewed. For example, after the alert handling system 304 removes the command from the plurality of commands to be reviewed, the alert handling system 304 may provide an indication of the remaining commands to be reviewed by skilled human analysts and/or the analyst review system 214. The remaining commands to be reviewed may have alerts labeled as benign or unknown but have a risk of being malicious that is above a threshold risk level.

In some aspects, the alert handling system 304 may be implemented as part of a machine monitoring service, as discussed above with regard to FIG. 1. The respective alerts of the plurality of executables may be detected by the alert detection system 302 implemented as part of the machine monitoring service. The alert detection system 302 may collect the plurality of executables from the plurality of executable source devices. The plurality of executables to be reviewed may be provided to an analyst review system 306 implemented as part of the machine monitoring service for further review.

In some aspects, for each classification model, the alert handling system 304 may parse or filter for alerts involving process start and rules that mention a particular component type of a executable to reduce false negatives from alerts that were triggered by something other than the particular component type (e.g., command line), and, therefore may not be well characterized by a classification model that looks specifically at the particular component type (e.g., command line). For example, the alert handling system 304 may receive updated rules, and pull out or extract one or more of the updated rules that mention the particular component type (e.g., command lines) as the set of candidates. The alert handling system 304 may check the manual exception list per executable. The manual exception list may be rules that do mention the particular executable component type (e.g., command lines). The alert handling system 304 may label these alerts as unknown. When the alert handling system 304 receives a new alert, the alert handling system 304 may examine or identify the generating rule. If the generating rule is in the candidate list (and not in the manual exclusions), the alert handling system 304 may run the alert through the model. If the rule is not a candidate, the alert handling system 304 may label the alert as "unknown."

In some aspects, each executable may have its own classification model and thus have its own set of tokens. For example, in a first classification model for a first executable, a token may be assigned to all URLs because for the first executable, URLs don't really matter (e.g., it may not matter which specific URL it is, only that it's a URL). Conversely, in a second classification model for a second executable, a different token may be assigned to each different URL particular URLs may be specifically benign or malicious when used with the second executable. The end classification model includes a plurality of classification models so that the end classification model may determine that type of executable and utilize an appropriate classification model of the plurality of classification models to determine probability of whether executables that are labeled benign are actually benign.

In some aspects, the alert handling system 304 may receive the same executable component in two or more different alerts. In one of the alerts, the executable component may be labeled as benign, and, in another alert, the executable component may be labeled as malicious. This situation may occur due to human error or because some information outside the alert was used to make the malicious and/or benign determination by the analyst review system 304. When the alert handling system 304 receives the same executable component in two or more different alerts and each with different labels, the alert handling system 304 may label both instances (or all instances) as unknown for training purposes. In some aspects, if a labeled alert (e.g., either malicious or benign) is received by the alert handling system 304 and is labeled based on something other than the particular executable component (e.g., command line), then the alert handling system 304 may label the alert as malicious to reduce false negatives In some aspects, the alert handling system 304 may separate the plurality of labeled alerts into the plurality of data sets based on an age of each respective labeled alert from a date that the respective labeled alert was received. For example, the age may include a threshold age that is no more than a year from the date that the respective labeled alert was received. In some aspects, the age could be no older than sixty days or one hundred days. In some aspects, the alert handling system 304 may pre-process one or more sections of the respective components that are foreign coded. For example, the alert handling system 304 may decode the one or more sections of the respective components that are foreign coded and insert the one or more decoded sections of respective components back into a position of the respective component within the respective executable.

Figure 4:
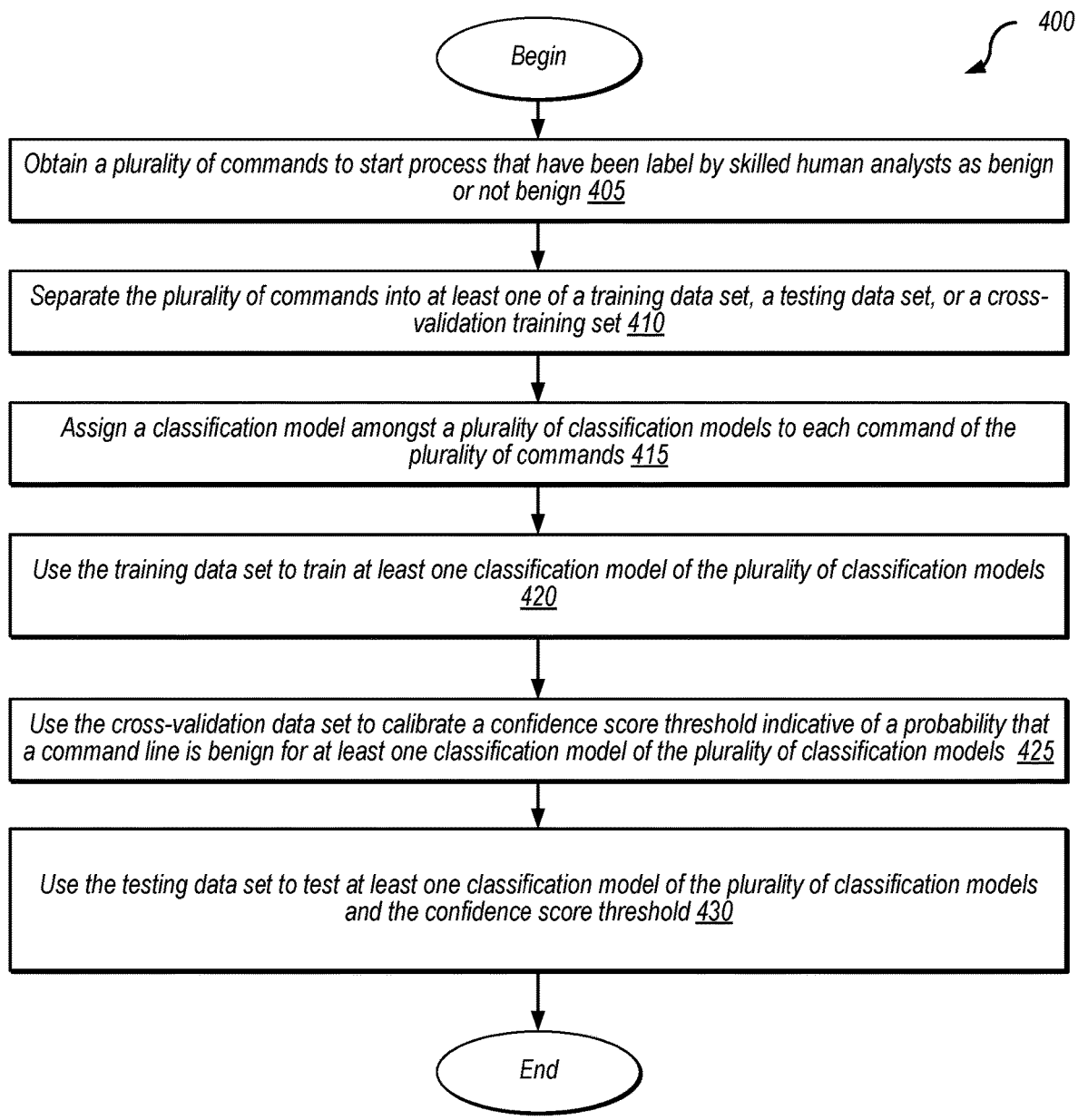
FIG. 4 illustrates a block diagram for classifying process start alerts according to some aspects.

FIG. 4 shows a flowchart illustrating a process 400 implemented by an alert handling system on a computing device for classifying process start alerts according to some aspects. The alert handling system on the computing system may be the alert handling system 146 illustrated in FIG. 1, the alert handling system 206 illustrated in FIG. 2, and/or the alert handling system 304 illustrated in FIG. 3. The process 400 implemented by an alert handling system on a computing device may include one or more same or similar features or process steps as described with respect to the machine monitoring system 130 illustrated in FIG. 1, the example system 200 illustrated in FIG. 2, and/or the example system 300 illustrated in FIG. 3. The alert handling system may be on a computing device that includes at least one same or similar features as the computing system 710 illustrated in FIG. 7.

At block 405, the alert handling system may obtain a plurality of commands to start process that have been label by skilled human analysts as benign or not benign. At block 410, the alert handling system may separate the plurality of commands into at least one of a training data set, a testing data set, or a cross-validation training set. At block 415, the alert handling system may assign a classification model amongst a plurality of classification models to each command of the plurality of commands. At block 420, the alert handling system may use the training data set to train at least one classification model of the plurality of classification models. At block 425, the alert handling system may use the cross-validation data set to calibrate a confidence score threshold indicative of a probability that a command line is benign for at least one classification model of the plurality of classification models. At block 430, the alert handling system may use the testing data set to test at least one classification model of the plurality of classification models and to test the confidence score threshold.

Figure 5:
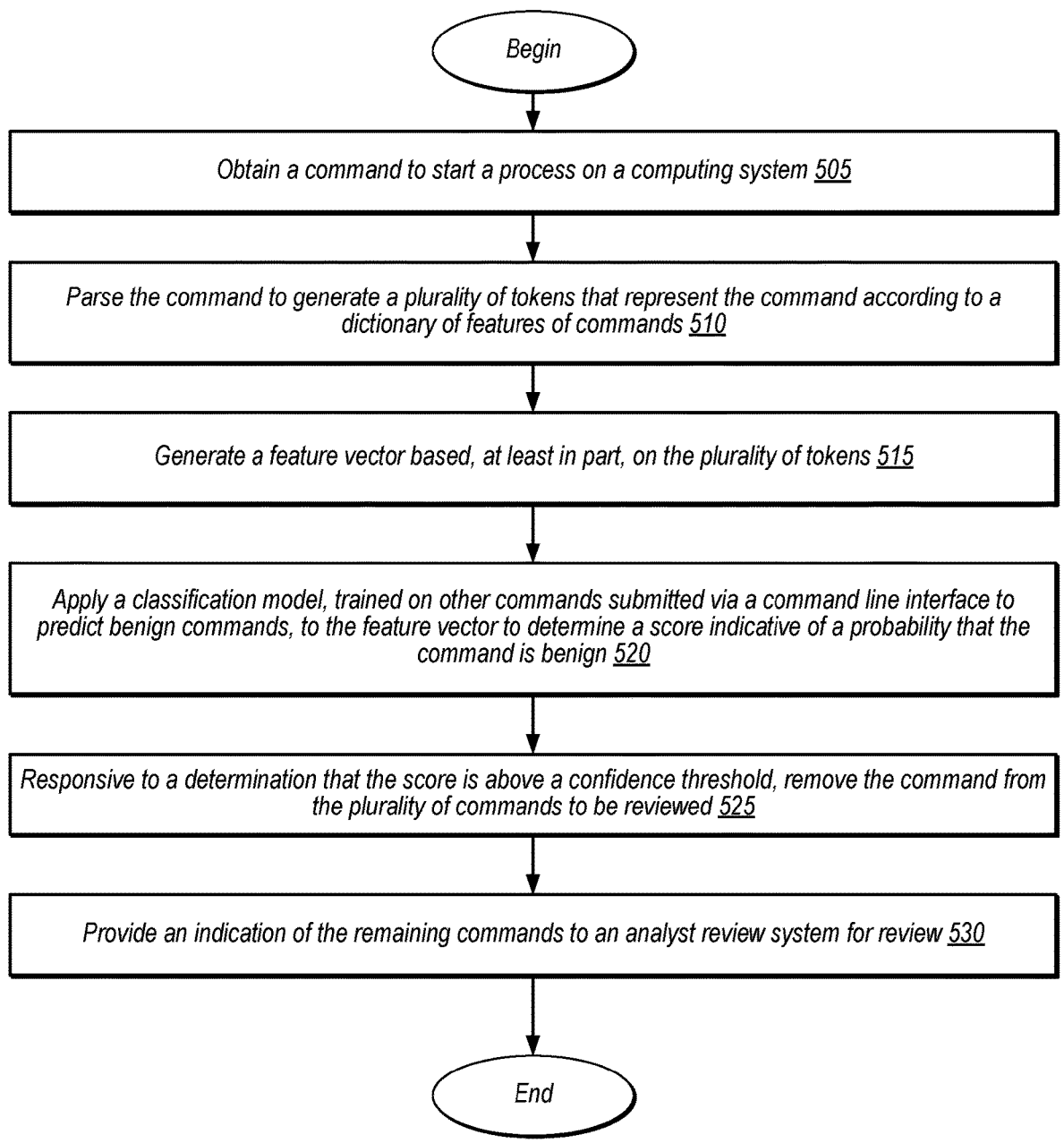
FIG. 5 shows a flowchart illustrating a process implemented by an alert handling system for classifying process start alerts according to some aspects.

FIG. 5 shows a flowchart illustrating a process 500 implemented by an alert handling system on a computing device for classifying process start alerts according to some aspects. The alert handling system on the computing system may be the alert handling system 146 illustrated in FIG. 1, the alert handling system 206 illustrated in FIG. 2, and/or the alert handling system 304 illustrated in FIG. 3. The process 500 implemented by an alert handling system on a computing device may include one or more same or similar features or process steps as described with respect to the machine monitoring system 130 illustrated in FIG. 1, the example system 200 illustrated in FIG. 2, the example system 300 illustrated in FIG. 3, and/or the process 400 illustrated in FIG. 4. The alert handling system may be on a computing device that includes at least one same or similar features as the computing system 710 illustrated in FIG. 7.

At block 505, the alert handling system may obtain a command to start a process on a computing system. At block 510, the alert handling system may parse the command to generate a plurality of tokens that represent the command according to a dictionary of features of commands. At block 515, the alert handling system may generate a feature vector base, at least in part, on the plurality of tokens. At block 520, the alert handling system may apply a classification model, trained on other commands submitted via a command line interface to predict benign commands, to the feature vector to determine a score indicative of a probability that the command line is benign. At block 525, the alert handling system may, responsive to a determination that the score is above a confidence threshold, remove the command from the plurality of commands to be reviewed. At block 530, the alert handling system may provide an indication of the remaining commands to an analyst review system for review.

Figure 6:
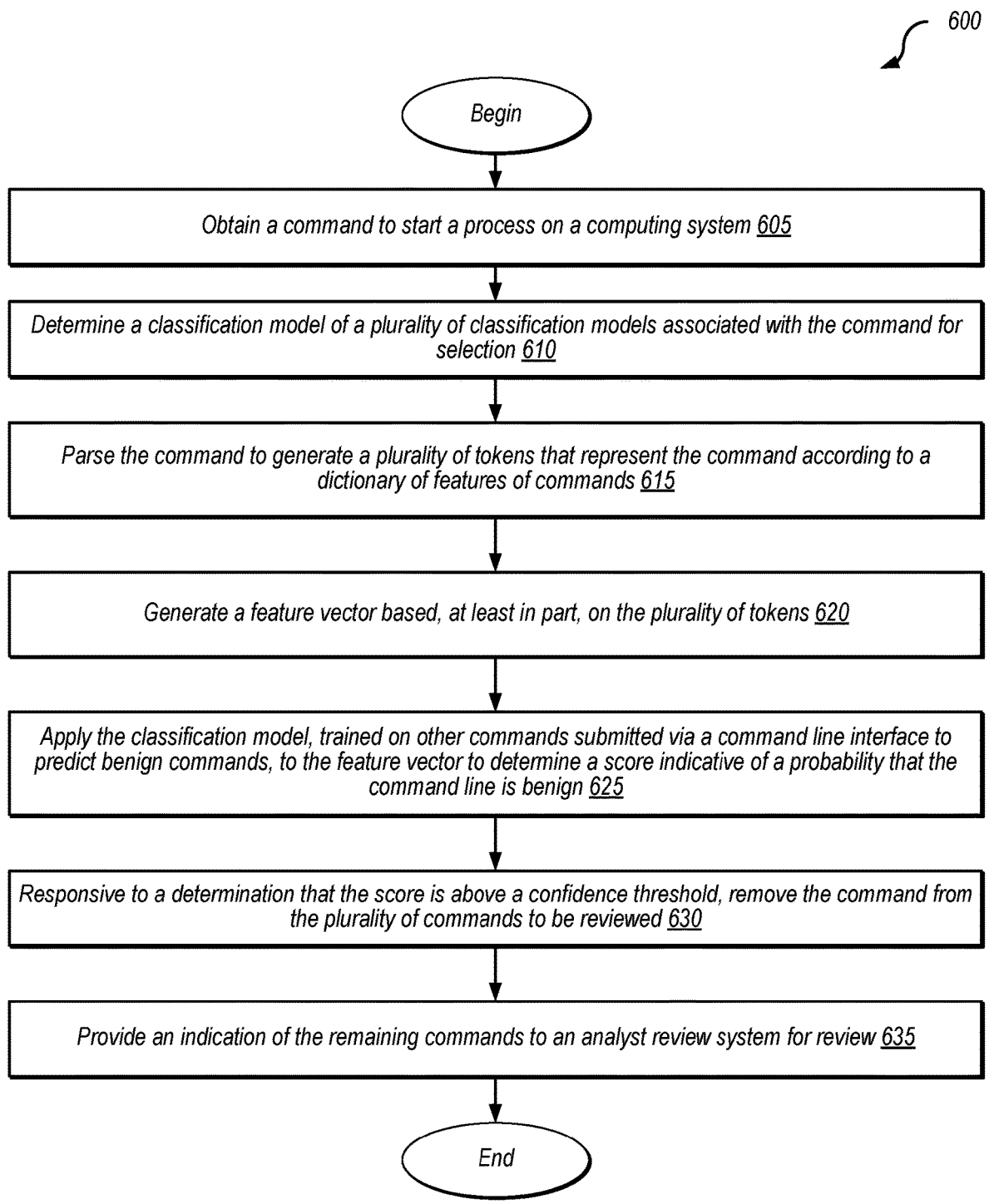
FIG. 6 shows a flowchart illustrating a process implemented by an alert handling system for classifying process start alerts according to some aspects.

FIG. 6 shows a flowchart illustrating a process 600 implemented by an alert handling system on a computing device for classifying process start alerts according to some aspects. The alert handling system on the computing system may be the alert handling system 146 illustrated in FIG. 1, the alert handling system 206 illustrated in FIG. 2, and/or the alert handling system 304 illustrated in FIG. 3. The process 600 implemented by an alert handling system on a computing device may include one or more same or similar features or process steps as described with respect to the machine monitoring system 130 illustrated in FIG. 1, the example system 200 illustrated in FIG. 2, the example system 300 illustrated in FIG. 3, the process 400 illustrated in FIG. 4, and/or the process 500 illustrated in FIG. 5. The alert handling system may be on a computing device that includes at least one same or similar features as the computing system 710 illustrated in FIG. 7.

At block 605, the alert handling system may obtain a command to start a process on a computing system. At block 610, the alert handling system may determine a classification model of a plurality of classification models associated with the command for selection. At block 615, the alert handling system may parse the command to generate a plurality of tokens that represent the command according to a dictionary of features of commands. At block 620, the alert handling system may generate a feature vector base, at least in part, on the plurality of tokens. At block 625, the alert handling system may apply a classification model, trained on other commands submitted via a command line interface to predict benign commands, to the feature vector to determine a score indicative of a probability that the command line is benign. At block 630, the alert handling system may, responsive to a determination that the score is above a confidence threshold, remove the command from the plurality of commands to be reviewed. At block 635, the alert handling system may provide an indication of the remaining commands to an analyst review system for review.

Figure 7:
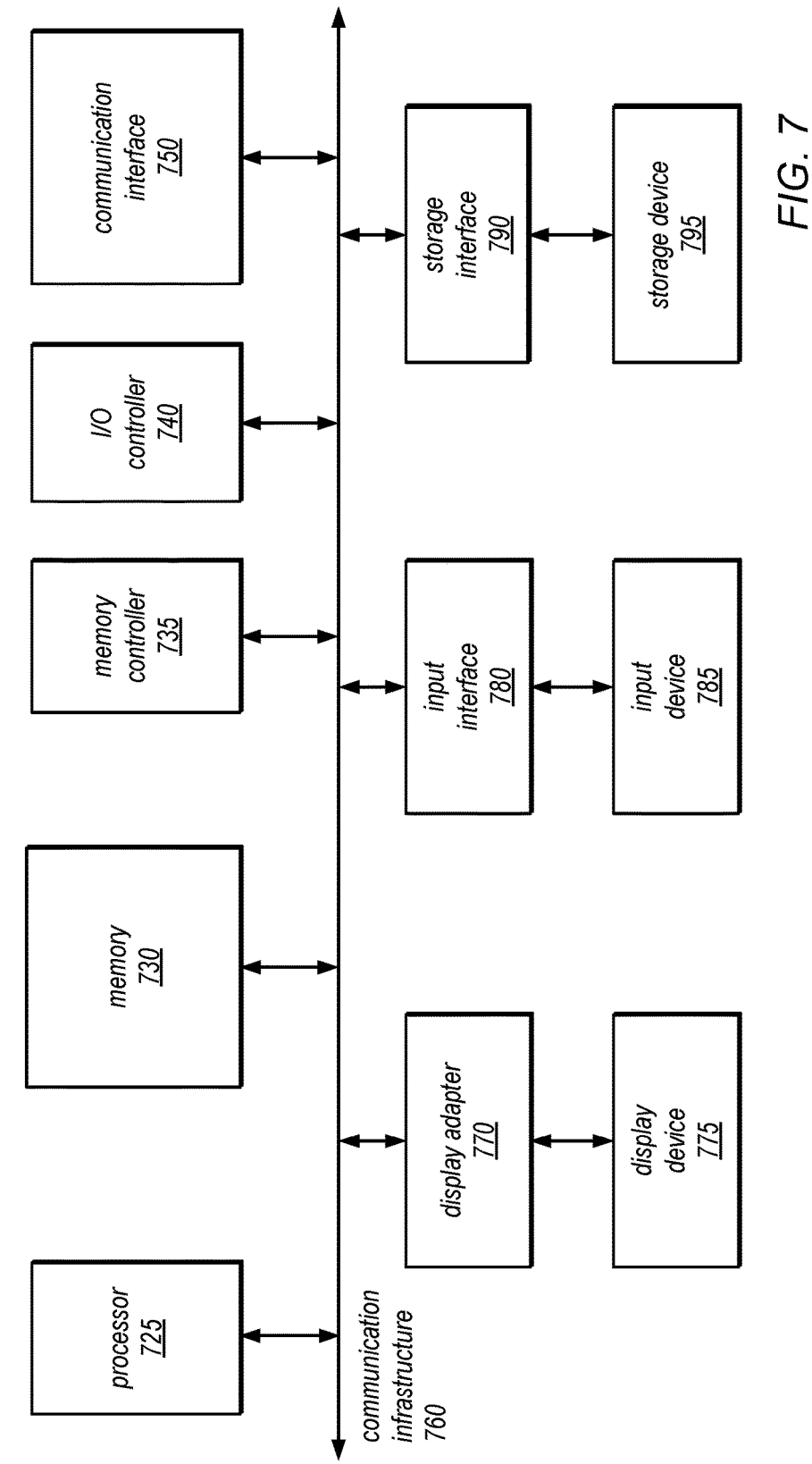
FIG. 7 is a block diagram of a computing system that may be used to implement one or more portions of a system for performing process start classification operations according to some aspects.

FIG. 7 is a block diagram of a computing system that may be used to implement one or more portions of a system for performing one or more processes as described herein according to some aspects. For example, computing system 710 can be used to implement process start alert classification according to some aspects as described herein. Computing system 710 broadly represents a single or multi-processor computing device or system capable of executing computer-readable instructions. Examples of computing system 710 include, without limitation, any one or more of a variety of devices including workstations, personal computers, laptops, client-side terminals, servers, distributed computing systems, handheld devices, network appliances, storage controllers, and the like. In one configuration, computing system 710 may include at least one processor 725 and a memory 730. By executing the software that implements asset assessment, computing system 710 becomes a special purpose computing device that is configured to perform asset assessment. The computing system 710 may be the same as or at least similar to one or more devices and/or systems described herein including an executable source device (e.g., a first executable source device 102*a*, a second executable source device 102*b*, an Nth executable source device 102*n*) illustrated in FIG. 1, an alert detection system 104 illustrated in FIG. 1, an alert handling system Processor 725 generally represents any type or form of processing unit capable of processing data or interpreting and executing instructions. In certain embodiments, processor 725 may receive instructions from a software application or module that may cause processor 725 to perform the functions of one or more of the embodiments described and/or illustrated herein. For example, processor 725 may perform and/or be a means for performing all or some of the operations described herein. Processor 725 may also perform and/or be a means for performing any other operations, methods, or processes described and/or illustrated herein. Memory 730 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments, computing system 710 may include both a volatile memory unit and a non-volatile storage device. In one example, program instructions implement process start alert classification according to some aspects may be loaded into memory 730.

In certain embodiments, computing system 710 may also include one or more components or elements in addition to processor 725 and/or memory 730. For example, as shown, computing system 710 may include a memory controller 735, an Input/Output (I/O) controller 740, and a communication interface 750, each of which may be interconnected via a communication infrastructure. Communication infrastructure 760 generally represents any type or form of infrastructure capable of facilitating communication between one or more components of a computing device. Examples of communication infrastructure 760 include, without limitation, a communication bus (such as an Industry Standard Architecture (ISA), Peripheral Component Interconnect (PCI), PCI express (PCIe), or similar bus) and a network.

Memory controller 735 generally represents any type/form of device capable of handling memory or data or controlling communication between one or more components of computing system 710. In certain embodiments memory controller 735 may control communication between processor 725, memory 730, and I/O controller 740 via communication infrastructure 760, and may perform and/or be a means for performing, either alone or in combination with other elements, one or more of the operations or features described and/or illustrated herein. I/O controller 740 generally represents any type or form of module capable of coordinating and/or controlling the input and output functions of a computing device. For example, in certain embodiments I/O controller 740 may control or facilitate transfer of data between one or more elements of computing system 710, such as processor 725, memory 730, communication interface 750, display adapter 770, input interface 780, and storage interface 790.

Communication interface 750 broadly represents any type/form of communication device/adapter capable of facilitating communication between computing system 710 and other devices and may facilitate communication between computing system 710 and a private or public network. Examples of communication interface 750 may include a wired network interface (e.g., network interface card), a wireless network interface (e.g., a wireless network interface card), a modem, and any other suitable interface. Communication interface 750 may provide a direct connection to a remote server via a direct link to a network, such as the Internet, and may also indirectly provide such a connection through, for example, a local area network. Communication interface 750 may also represent a host adapter configured to facilitate communication between computing system 710 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 710 may also include at least one display device 775 coupled to communication infrastructure 760 via a display adapter 770 that generally represents any type or form of device capable of visually displaying information forwarded by display adapter 770. Display adapter 770 generally represents any type or form of device configured to forward graphics, text, and other data from communication infrastructure 760 (or from a frame buffer, as known in the art) for display on display device 775. Computing system 710 may also include at least one input device 785 coupled to communication infrastructure 760 via an input interface 780. Input device 785 generally represents any type or form of input device capable of providing input, either computer or human generated, to computing system 710. Examples of input device 785 include a keyboard, a pointing device, a speech recognition device, or any other input device.

Computing system 710 may also include storage device 795 coupled to communication infrastructure 760 via a storage interface 790. Storage device 795 generally represents any type or form of storage devices or mediums capable of storing data and/or other computer-readable instructions. For example, storage device 795 may include a magnetic disk drive (e.g., a so-called hard drive), a floppy disk drive, a magnetic tape drive, an optical disk drive, a flash drive, or the like. Storage interface 790 generally represents any type or form of interface or device for transmitting data between storage device 795, and other components of computing system 710. Storage device 795 may be configured to read from and/or write to a removable storage unit configured to store computer software, data, or other computer-readable information. Examples of suitable removable storage units include a floppy disk, a magnetic tape, an optical disk, a flash memory device, or the like. Storage device 795 may also include other similar structures or devices for allowing computer software, data, or other computer-readable instructions to be loaded into computing system 710. For example, storage device 795 may be configured to read and write software, data, or other computer-readable information. Storage device 795 may also be a part of computing system 710 or may be separate devices accessed through other interface systems.

Many other devices or subsystems may be connected to computing system 710. Conversely, all of the components and devices illustrated in the figure need not be present to practice the embodiments described and/or illustrated herein. The devices and subsystems referenced above may also be interconnected in different ways from that shown in the figure. Computing system 710 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 710 for storage in memory via a network such as the Internet or upon a carrier medium.

The computer-readable medium containing the computer program may be loaded into computing system 710. All or a portion of the computer program stored on the computer-readable medium may then be stored in memory 730, and/or various portions of storage device 795. When executed by processor 725, a computer program loaded into computing system 710 may cause processor 725 to perform and/or be a means for performing the functions of one or more of the embodiments described/illustrated herein. Alternatively, one or more of the embodiments described and/or illustrated herein may be implemented in firmware and/or hardware.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure.

What is claimed is:

1. A system comprising:
one or more processors; and
a memory, storing program instructions that when executed by the one or more processors, cause the one or more processors to implement an alert handling system, the alert handling system configured to:
obtain a command to start a process on a computing device submitted via a command line interface, wherein the command was captured at the computing device, wherein the command triggered a process start alert for a process started at the computing device, and wherein the process start alert is among a plurality of alerts to be reviewed by one or more analysts;
parse the command to generate a plurality of tokens that represent the command according to dictionary of features of commands submitted via the command line interface, including to replace a block of characters in the command with a mask token corresponding to a generic feature of the command;
generate a feature vector based, at least in part, on the plurality of tokens, wherein the feature vector includes one or more features that represent a lineage of one or more parent processes at led to the start of the process;
apply a classification model, trained on other commands submitted via the command line interface to predict benign commands, to the feature vector to determine a score indicative of a probability that the command is benign; and responsive to a determination that the score is above a confidence threshold, remove the process start alert from the plurality of alerts to be reviewed, wherein the confidence threshold is calibrated by applying the classification model to a cross-validation dataset.

2. The system of claim 1, wherein the alert handling system is further configured to:

apply the classification model to a second feature vector generated from a second command that triggered a second process start alert to determine a second score indicative of a second probability that the second command is benign; and responsive to a determination that the second score is below the confidence threshold, retain the second process start alert in the plurality of alerts to be reviewed.

3. The system of claim 2, wherein to retain the second command in the plurality of commands to be reviewed, the alert handling system is configured to send the second command to an analyst review system for further review.

4. The system of claim 1, wherein the block of characters in the command is an IP address, and the mask token is a textual label used to replace different IP addresses in different commands.

5. The system of claim 1, wherein to parse a second command submitted via the command line interface that triggered a second process start alert, the alert handling system is configured to replace a second block of characters of a path in the second command with a normalized value as part of a second mask token.

6. The system of claim 1, wherein to parse the command to generate the plurality of tokens that represent the command according to the dictionary of features of commands submitted via the command line interface, the alert handling system is configured to remove one or more characters or modify one or more characters from at least one of the plurality of tokens to normalize the plurality of tokens.

7. The system of claim 1, wherein the classification model is trained on a subset of the dictionary of features of the commands submitted via the command line interface.

8. The system of claim 1, wherein the alert handling system is further configured to:

collect performance metrics of the classification model; and perform additional training of the classification model based on the performance metrics, wherein the additional training is performed using training data developed based on feedback from the one or more analysts or synthetic data.

9. The system of claim 1, wherein the classification model is identified based on an executable specified in the command.

10. The system of claim 1, wherein the alert handling system is implemented as part of a machine monitoring service, wherein the alerts are detected by an alert detection system implemented as part of the machine monitoring service, wherein the alert detection system collects the plurality of commands from a plurality of computing devices, and wherein the alerts to be reviewed are provided to the one or more analysts via a graphical alert interface.

11. A method implemented by a system, comprising:

obtaining a command to start a process on a computing device submitted via a command line interface, wherein the command was captured at the computing device, wherein the command triggered a process start alert for a process started at the computing device, wherein the process start alert is among a plurality of alerts to be reviewed by one or more analysts;

parsing the command to generate a plurality of tokens that represent the command according to dictionary of features of commands submitted via the command line interface, including replacing a block of characters in the command with a mask token corresponding to a generic feature of the command;

generating a feature vector based, at least in part, on the plurality of tokens, wherein the feature vector includes one or more features that represent a lineage of one or more parent processes at led to the start of the process;

applying a classification model, trained on other commands submitted via the command line interface to predict benign commands, to the feature vector to determine a score indicative of a probability that the command is benign; and responsive to a determination that the score is above a confidence threshold, removing the process start alert from the plurality of alerts to be reviewed, wherein the confidence threshold is calibrated by applying the classification model to a cross-validation dataset.

12. The method of claim 11, further comprising:

applying the classification model to a second feature vector generated from a second command that triggered a second process start alert to determine a second score indicative of a second probability that the second command is benign; and responsive to a determination that the second score is below the confidence threshold, retaining the second process start alert in the plurality of alerts to be reviewed.

13. The method of claim 12, wherein retaining the second command in the plurality of commands to be reviewed comprises sending the second command to an analyst review system for further review.

14. The method of claim 11, wherein the block of characters in the command is an IP address, and the mask token is a textual label used to replace different IP addresses in different commands.

15. The method of claim 11, wherein parsing the command to generate the plurality of tokens that represent the command according to dictionary of features of commands submitted via the command line interface comprises replacing a block of characters of a path in the command with a normalized value as part of a mask token.

16. The method of claim 11, wherein parsing the command to generate the plurality of tokens that represent the command according to the dictionary of features of commands submitted via the command line interface comprises removing one or more characters or modify one or more characters from at least one of the plurality of tokens to normalize the plurality of tokens.

17. The method of claim 11, wherein the classification model is trained on a subset of the dictionary of features of the commands submitted via the command line interface.

18. A non-transitory, computer-readable storage medium storing one or more electrically executable instructions that, when executed by one or more processors, cause the one or more processors to:

obtain a command to start a process on a computing device submitted via a command line interface, wherein the command was captured at the computing device, wherein the command triggered a process start alert for a process started at the computing device, and wherein the process start alert is among a plurality of alerts to be reviewed by one or more analysts;

parse the command to generate a plurality of tokens that represent the command according to dictionary of features of commands submitted via the command line interface, including to replace a block of characters in the command with a mask token corresponding to a generic feature of the command;

generate a feature vector based, at least in part, on the plurality of tokens, wherein the feature vector includes one or more features that represent a lineage of one or more parent processes at led to the start of the process;

apply a classification model, trained on other commands submitted via the command line interface to predict benign commands, to the feature vector to determine a score indicative of a probability that the command is benign; and responsive to a determination that the score is above a confidence threshold, remove the process start alert from the plurality of alerts to be reviewed, wherein the confidence threshold is calibrated by applying the classification model to a cross-validation dataset.

19. The non-transitory, computer-readable storage medium of claim 18, wherein the one or more electrically executable instructions further cause the one or more processors to:

apply the classification model to a second feature vector generated from a second command that triggered a second process start alert to determine a second score indicative of a second probability that the second command is benign; and responsive to a determination that the second score is below the confidence threshold, retain the second process start alert in the plurality of alerts to be reviewed.

20. The non-transitory, computer-readable storage medium of claim 19, wherein retaining the second command in the plurality of commands to be reviewed comprises sending the second command to an analyst review system for further review.

* * * * *